June 2, 1953  C. Q. HEFNER  2,640,353
HYDRAULIC TRACTOR DRAWBAR POUNDS PULL TESTER
Filed Sept. 18, 1950
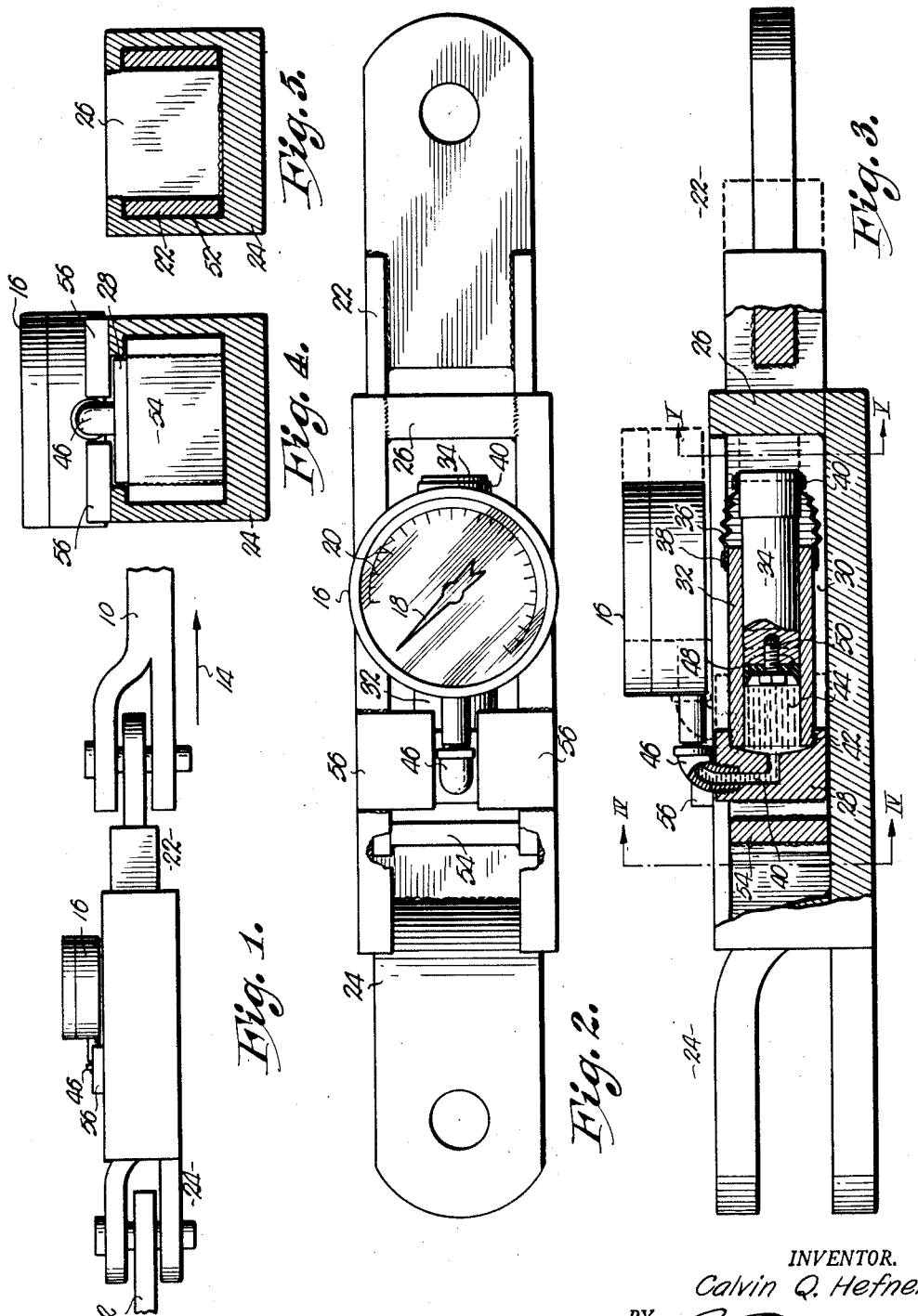
INVENTOR.
Calvin Q. Hefner
BY
ATTORNEY.

Patented June 2, 1953

2,640,353

UNITED STATES PATENT OFFICE 2,640,353

HYDRAULIC TRACTOR DRAWBAR POUNDS PULL TESTER

Calvin Q. Hefner, Sublette, Kans.

Application September 18, 1950, Serial No. 185,459

2 Claims. (Cl. 73—141)

This invention relates to the art of force measurement and has for its primary aim the provision of an instrument designed particularly for interposition between a towing device, such as a tractor or the like, and a towed implement of any form, which instrument indicates to the operator the number of pounds pull being exerted.

One of the primary aims of this invention is to provide an hydraulic pounds pull tester of the aforementioned general character and which is particularly designed to be positioned between a tractor and the load being drawn thereby, whereby the operator may quickly and accurately determine the force being exerted in the towing operation and learn from time to time the precise number of pounds pull being exerted.

A still further aim of this invention is the provision of an hydraulic pounds pull indicating instrument which is effective when forming a part of the drawbar assembly of a tractor and that will permit the operator to test both the action of the tractor and resistance of the load being towed thereby without the employment of expensive, complicated and involved apparatus which otherwise might effect the normal function of the tractor and its load.

Additional and important objects of this invention are to provide a pounds pull tester of the aforementioned general form and character and which is relatively inexpensive to produce, will not become maladjusted during normal employment and that may be interposed between a pulling tractor and its load with speed and assurance that the results indicated by the gauge forming a part of the instrument will be accurate.

Details of construction are important and such objects of the invention as are embodied therein will appear during the course of the following specification, referring to accompanying drawing, wherein:

Fig. 1 is a side elevational view of an hydraulic tractor drawbar pounds pull tester made in accordance with this invention.

Fig. 2 is a top plan view of the said pounds pull tester per se.

Fig. 3 is a fragmentary, side elevational view with parts broken away to reveal the nature and disposition of the gauge-actuating cylinder and plunger.

Fig. 4 is a cross sectional view taken on line IV—IV of Fig. 3; and,

Fig. 5 is a cross sectional view taken on line V—V of Fig. 3.

In the normal operation of the instrument, the same is interposed between the drawbar 10 of an ordinary tractor (not here shown) and the work 12 to which force is being applied by said tractor. The force is exerting a pull in the direction of the arrow 14 illustrated in Fig. 1; and, when force is exerted, the pounds pull is indicated by the gauge 16 having a movable pointer 18 and indicia 20. This gauge 16 is of a well-known commercial type and constitutes no part of the invention other than its inclusion in the combination of elements hereinafter to be described.

The instrument broadly comprises a pair of slidably-interengaged sections designated by the numerals 22 and 24, the former being removably affixed to drawbar 10 while the latter is connected to a portion of the work 12. If the pulling capacity of the tractor or machine attached to section 22 through drawbar 10 is to be determined without the use of a towed implement or load, the element 12 is anchored and section 24 remains stationary while section 22 is moved relative thereto by the pull of the tractor in the direction of arrow 14.

Section 24 has a laterally-extending portion or abutment 26 in directly-opposed relation with a laterally-projected portion or head 28 formed on section 22. The space formed between projections 26 and 28 is designated by the numeral 30 and occupied by cylinder 32 and its contained plunger 34. This plunger is shiftable longitudinally in cylinder 32, and a portion of the said plunger projects beyond the end of cylinder 32, as illustrated in Fig. 3. This projected portion of plunger 34 is protected by a dust skirt 36 having one marginal edge attached to cylinder 32, as at 38, while the opposite marginal edge is secured as at 40 to the outermost end of plunger 34.

This skirt 36 is in the nature of a bellows; and, as relative movement between cylinder 32 and 34 takes place, the skirt will fold to accommodate the varying distances between the end of cylinder 32 and the outwardly-projecting end of plunger 34.

Head 28 is provided with a bore 40 and an internally-threaded socket 42, the latter receiving the threaded end of cylinder 32 opposite that end from which plunger 34 projects. Cylinder 32 is partially filled with fluid 44, and it is this fluid 44 which constitutes the motivating medium for pointer 18 forming a part of gauge 16. Bore 40 is in communication with a conduit 46, and this conduit 46 connects with and supports gauge 16. Fluid 44 is retained in that part of cylinder 32 not occupied by plunger 34, bore 40 and conduit 46 by the innermost end of plunger 34 which is fortified by a seal 48 clearly illustrated in section in Fig. 3.

This seal is secured to the end of plunger 34 by a machine screw 50, and the cup-shape of seal 48 insures the retention of fluid 44. Lateral projection or abutment 26 on section 24 is in the line of travel of plunger 34 as sections 22 and 24 are relatively shifted longitudinally; and, as the space 30 between lateral projections 26 and 28 is diminished, plunger 34 will be forced into cylinder 32 to drive fluid 44 into gauge 16 and actuate pointer 18 to indicate the amount of force being exerted by the device or devices being tested.

Sections 22 and 24 are formed as clearly illustrated in Figs. 2, 4 and 5, and section 24 has ways 52 along each of its two longitudinal sides to receive portions of section 22 as shown in Fig. 5. Head or laterally-projecting member 28 on section 22 interconnects the portions of section 22 which lie in these ways 52 provided in section 24, and the portions of sections 22 which lie in these ways 52 are joined by tie member 54, as illustrated in Figs. 2 and 3.

Ears 56 overlie head or laterally-projecting portion 28 of section 22 and are integral with section 24. Thus, the particular form and arrangement of the parts constituting sections 22 and 24 insure stable interengagement during relative longitudinal sliding action, and the compressing action exerted upon the cylinder and plunger assembly disposed between elements 26 and 28 is definite and effective.

Such modifications as may fall within the scope of the appended claims are contemplated and may be enjoyed without departing from the spirit of the invention.

Having thus described my invention, what is claimed as new and desired to be secured by Letters Patent is:

1. A pounds pull tester of the character described comprising an elongated, longitudinally U-shaped section having means at one end thereof for attachment to a towing tractor or the like, and a laterally extending portion at the opposite bight end thereof; an hydraulically-operated gauge mounted on said portion; a cylinder, having a partial filling of fluid, carried by said portion and in communication with the gauge; a plunger slidably disposed in the cylinder with a portion thereof extending beyond the cylinder; a second section having means at one end thereof for attachment to a towed implement or the like, said second section having a pair of opposed, longitudinally extending ways, the first-mentioned section having elongated portions slidably disposed within said ways; and an abutment on the second section at the opposite end thereof separate from the plunger and positioned to slide the plunger in the cylinder toward said laterally extending portion as the second section slides upon the first-mentioned section to move the gauge, the cylinder, and the plunger toward the abutment, and thereby force the plunger into engagement with the abutment, the extended portion of said plunger having a closed, expansible, bellows skirt thereover, said skirt being formed to house the extended portion of the plunger as the length varies due to movement of the plunger in the cylinder.

2. Combination pounds pull testing and linkage apparatus for pivotally interconnecting a tractor or the like having an elongated, normally vertical pivot element adjacent the rear thereof and an implement or the like having an elongated, normally vertical pivot member adjacent the forward end thereof and in longitudinal parallelism with said element, said apparatus comprising a first, elongated section having its longitudinal axis normally disposed horizontally and provided with a U-shaped portion at one end thereof and a connector portion at the opposite end thereof, said U-shaped portion having a bight portion extending laterally of the first section at said one end of the latter and a pair of elongated, spaced, parallel leg portions extending in a normally horizontal direction from the bight portion to the connector portion, said bight portion having a normally uppermost surface and a face between the zone of juncture of the leg portions with the bight portion, there being an elongated passage extending through the bight portion and communicating with said surface and said face thereof, said connector portion having a normally vertical bore therethrough adapted for pivotally receiving said element; an hydraulically operated pressure gauge mounted on said surface of the bight portion in communication with one end of said passage; an elongated cylinder having a partial filling of fluid, mounted on said face of the bight portion in communication with the other end of said passage and extending horizontally from said face between and in parallelism with the leg portions; an elongated plunger slidably disposed in the cylinder with a length of said plunger adjacent one end thereof extending beyond the cylinder at the end of the latter remote from said face of the bight portion; a second, elongated section having its longitudinal axis normally disposed horizontally and provided with a track presenting portion at one end thereof and a coupler portion at the opposite end thereof, said track presenting portion being provided with a pair of opposed, longitudinally extending ways slidably receiving the leg portions of the U-shaped portion of said first section, said track presenting portion being provided at said one end of the second section with an upstanding abutment disposed to engage said one end of the plunger for sliding the plunger in the cylinder in a direction toward said face of the head as the first section carrying the cylinder and the gauge slides in the ways of the second section in a direction decreasing the distance between the face of the bight portion of said first section and the abutment on said second section, said coupler portion being provided with a normally vertical bore therethrough adapted for pivotally receiving said member; and a closed, expansible, bellows skirt mounted upon the cylinder in covering relationship to the extended length of the plunger for housing the latter as the longitudinal dimension thereof varies due to movement of the plunger in the cylinder.

CALVIN Q. HEFNER.

References Cited in the file of this patent

UNITED STATES PATENTS

| Number | Name | Date |
|---|---|---|
| 680,371 | Brittan | Aug. 13, 1901 |
| 1,361,990 | Hatcher et al. | Dec. 14, 1920 |
| 1,433,067 | Burr | Oct. 24, 1922 |